United States Patent
Sarkar (12) 
(10) Patent No.: US 6,510,500 B2
(45) Date of Patent: Jan. 21, 2003

(54) SYSTEM AND METHOD FOR MINIMIZING MESSAGE TRANSACTIONS FOR FAULT-TOLERANT SNAPSHOTS IN A DUAL-CONTROLLER ENVIRONMENT

(75) Inventor: Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 09/802,827

(22) Filed: Mar. 9, 2001

(65) Prior Publication Data

US 2002/0129214 A1 Sep. 12, 2002

(51) Int. Cl.[7] .............................................. G06F 12/16
(52) U.S. Cl. ........................ 711/162; 707/204; 707/205; 711/114; 711/161
(58) Field of Search .............................. 707/204, 205; 711/114, 161, 162

(56) References Cited

U.S. PATENT DOCUMENTS

| | | | | |
|---|---|---|---|---|
| 6,058,054 A | * | 5/2000 | Islam et al. .................. 365/200 |
| 6,076,148 A | * | 6/2000 | Kedem ........................ 711/162 |
| 6,182,198 B1 | * | 1/2001 | Hubis et al. ................. 707/204 |
| 6,269,431 B1 | * | 7/2001 | Dunham ...................... 707/204 |
| 6,308,284 B1 | * | 10/2001 | LeCrone et al. ............... 714/3 |
| 6,324,654 B1 | * | 11/2001 | Wahl et al. .................. 707/204 |
| 6,415,296 B1 | * | 7/2002 | Challener et al. ........... 707/200 |
| 6,434,681 B1 | * | 8/2002 | Armangau .................. 711/162 |

* cited by examiner

Primary Examiner—Than Nguyen
(74) Attorney, Agent, or Firm—John L. Rogitz (57) ABSTRACT

A computer-implemented method for managing data snapshots among source and target storage volumes in a dual-controller environment. A configuration space that maps the source and target storage volumes to first and second logical drives respectively is established. The configuration space is then divided into first and second portions, wherein a first storage controller controls the first portion and a second storage controller controls the second portion. A snapshot relationship is established between the source and target storage volumes such that portions of data on the source storage volume are logically mirrored on the target storage volume. The identical snapshot relationship is stored in both the first and second storage controllers. In response to a request to perform an operation that results in a modification of the snapshot relationship, the operation is performed. and then a modified snapshot relationship is transferred to the first and second controllers. The modified snapshot relationship reflects the operation, thereby synchronizing the snapshot relationship data in the first and second controllers.

20 Claims, 8 Drawing Sheets

C DRIVE

| CHUNCK | SOURCE | TARGET |
|---|---|---|
| 1 | C | D |
| 2 | C | D |
| 3 | D | |
| | | |
| | | |
| | | |

24 → (row 3)
30 (CHUNCK), 32 (SOURCE), 34 (TARGET)

D DRIVE

| CHUNCK | SOURCE | TARGET |
|---|---|---|
| 1 | C | |
| 2 | C | |
| 3 | D | C |
| | | |
| | | |
| | | |

26 → (row 3)

E DRIVE

| CHUNCK | SOURCE | TARGET |
|---|---|---|
| | E | |
| | E | |
| | E | |
| | | |
| | | |
| | | |

28 → (row 3)

FIG. 5A

C DRIVE

| CHUNCK | SOURCE | TARGET |
|--------|--------|--------|
| 1 | C | D |
| 2 | C | D |
| 3 | C | D |
|   |   |   |
|   |   |   |
|   |   |   |

D DRIVE

| CHUNCK | SOURCE | TARGET |
|--------|--------|--------|
| 1 | C |   |
| 2 | C |   |
| 3 | C |   |
|   |   |   |
|   |   |   |
|   |   |   |

SYSTEM AND METHOD FOR MINIMIZING MESSAGE TRANSACTIONS FOR FAULT-TOLERANT SNAPSHOTS IN A DUAL-CONTROLLER ENVIRONMENT

BACKGROUND OF THE INVENTION

1. Field of the Invention

The present invention relates generally to fault-tolerant data management, and more particularly to systems and methods for managing snapshots of metadata in a dual controller environment.

2. Description of the Related Art

There has been an increasing demand for access to high performance and fault-tolerant data storage to keep pace with advances in computing infrastructures. While the cost of storage devices such as hard disk drives (HDDs) has been plummeting due to manufacturing improvements, the cost of managing data storage has risen steadily. Storage management has become critical to many enterprises that rely on online access to operational and historic data in their day-to-day business operations.

However, HDDs are prone to failure of their electromechanical components. Hence, storage systems that include many HDDs need to have redundancy built into them, to avoid data loss when an HDD fails. One popular technique for avoiding the loss of data from HDD failure is known as Redundant Array of Independent Disks (RAID), which is a class of algorithms that store data redundantly on an array of HDDs.

Since RAID algorithms add redundancy to user data and decide data layout on the HDDs, they are executed on a dedicated hardware storage controller in order to free the host processor-memory complex from the task of executing these algorithms. These hardware components typically include a dedicated processor and memory, as well as Application Specific Integrated Circuits (ASICs), which perform Exclusive OR (XOR) parity calculations, protocol processing, etc. In RAID systems a host machine communicates with this hardware either through the system bus (in which case the storage controller is called a RAID adapter) or via a storage interconnect like Small Computer System Interface (SCSI) (in which case the hardware is called a RAID controller). HDDs connected to the controller are mapped to logical drives that are created via configuration commands sent to the controller by an application. A logical drive is a storage extent that is externalized by the controller to its host and resembles and extent on a HDD. The RAID controller, depending on the RAID level chosen for a logical drive, decides the location and the need to update redundant data.

Unfortunately, RAID adapters and RAID controllers, like HDDs, are also subject to failure. One way to address the possible failure of a data storage controller is to provide a second controller. The operation of a storage system using two controllers is referred to as "dual-mode", while operation with only a single controller is called "simplex-mode". In dual-mode, each storage controller contains metadata that defines the current mapping of the logical drives onto a physical disk. However, if one controller fails there is the possibility of a loss of this metadata. This is a particular concern in systems that use fault tolerant metadata snapshots.

Snapshots are a high level feature of storage subsystems that allow a logical copy of a source drive to be copied onto a target drive instantaneously. A snapshot of data at a time "t" creates, in a target data volume, a logical copy of data in a source data volume. Physical copying of the data from the source volume to the target volume can then subsequently take place. Any intervening changes ("writes") to data in the source volume are momentarily delayed while the original version of the data sought to be changed is preferentially copied from the source volume to the target volume. Thus, the snapshot of data in the target volume represents the exact state of the data in the source volume at the time "t".

Snapshots, as defined above, are useful for backing up data and for testing. For example, taking a snapshot of frequently changing data facilitates the execution of test applications against the snapshot of the data, without the test application execution being unduly interfered with by changes to the data. Moreover, the snapshot mechanism facilitates faster data backups by a storage subsystem as compared to file system-based backups, which entail host CPU processing and which require the allocation of relatively high network bandwidth.

In general, the snapshot mechanism's data structures must keep track of what has been copied over from the source drive to the target drive, so that the mechanism returns the data from the correct location. If data is to be written to the source drive, a copy must first be initiated from the source to the target before allowing the write to proceed. To keep track of which data has been copied over from the source to the target, the source drives are generally divided into segments. The size of each segment is generally fixed throughout the storage subsystem and is determined by latency issues. In particular, if the segment size is too large, then reading a byte of data will incur the latency of the transfer of a full segment's worth of data. In some systems, the segments are organized into segment ranges to facilitate the tracking of the status of snapshots of segments. Each segment in a range has the same property: within a given range, either all of the segments, or none of the segments, have been copied over.

In dual-mode, each storage controller has control of different portion of the configuration space that maps the logical drives onto the physical disks. Hence, the snapshot metadata in each controller will change independently of each other. As a result, if one controller fails, the other controller will not have the current state of the snapshot metadata that resides in the failed controller. Thus there is a need for a way to manage snapshot metadata in a dual-mode data storage system to prevent the loss of snapshot metadata in the event that one of the controllers fails. Also, there is a need for a way to accomplish this kind of management of a dual-mode data storage system without significantly adding to the total number of messages required.

The present invention has carefully considered the above problems and has provided the solution set forth herein.

SUMMARY OF THE INVENTION

A computer-implemented method is disclosed for managing data snapshots among source and target storage volumes in a dual-controller environment. The method includes establishing a configuration space that maps the source and target storage volumes to first and second logical drives respectively. The configuration space is then divided into first and second portions, wherein a first storage controller controls the first portion and a second storage controller controls the second portion. A snapshot relationship is established between the source and target storage volumes such that portions of data on the source storage volume are logically mirrored on the target storage volume. The identical snapshot relationship is stored in both the first and second storage controllers.

In accordance with one aspect of the invention, in response to a request to perform an operation that results in a modification of the snapshot relationship, the operation is first performed, and then a modified snapshot relationship is transferred to both the first and second controllers. The modified snapshot relationship reflects the operation, thereby synchronizing the snapshot relationship data in the first and second controllers.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
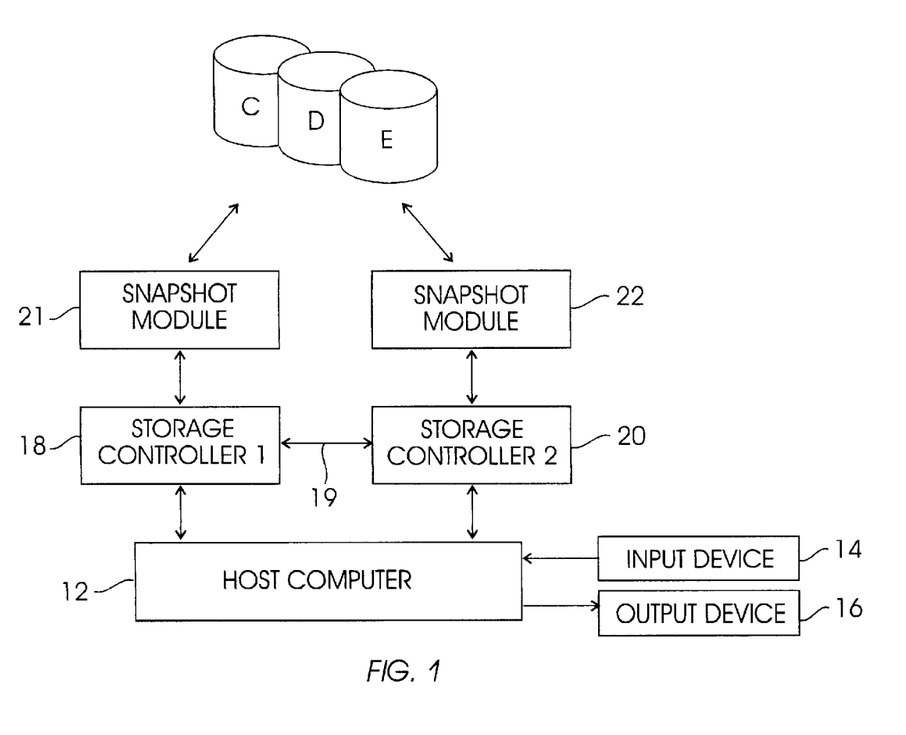
FIG. 1 is a block diagram of the architecture of the present system.

Referring initially to FIG. 1, a data storage system is shown, generally designated 10, for invoking and executing snapshot relationships between plural data storage volumes C, D, and E, such that a read or write can be made to any storage volume. As shown, the system 10 can include a computer 12 including a respective input device 14 such as a keyboard with, e.g., a point and click device, and an output device 16, such as a monitor, printer, other computer, or computer network. Also, the computer 12 accesses a pair of storage controllers 18 and 20, which each access a corresponding software-implemented snapshot module 21 and 22 respectively, for undertaking the inventive steps herein. Private communication channel 19 provides a link between the two controllers, as described in more detail below.

The computer 12 can be a personal computer made by International Business Machines Corporation (IBM) of Armonk, N.Y. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as data storage devices.

Figure 2:
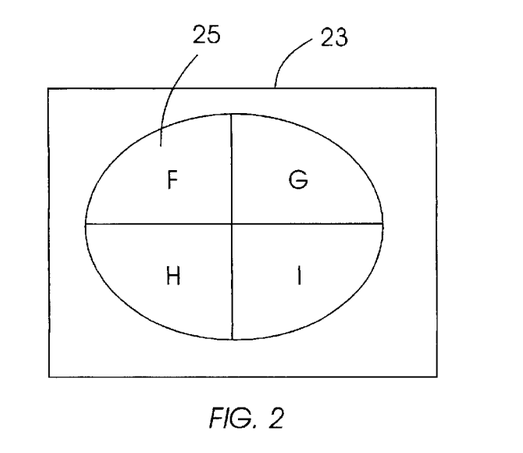
FIG. 2 is a schematic diagram of a computer program product.

In any case, the processor of the computer 12 accesses the snapshot module 18 to undertake the logic of the present invention, which may be executed by a processor as a series of computer-executable instructions. The instructions may be contained on a data storage device with a computer readable medium, such as a computer diskette 23 shown in FIG. 2 having a computer usable medium 25 with code elements F, G, H and I stored thereon. Or, the instructions may be stored on random access memory (RAM) of the computer 12, on a DASD array, or on magnetic tape, conventional hard disk drive, electronic read-only memory, optical storage device, or other appropriate data storage device. In an illustrative embodiment of the invention, the computer-executable instructions may be lines of C++ code.

Figure 6:
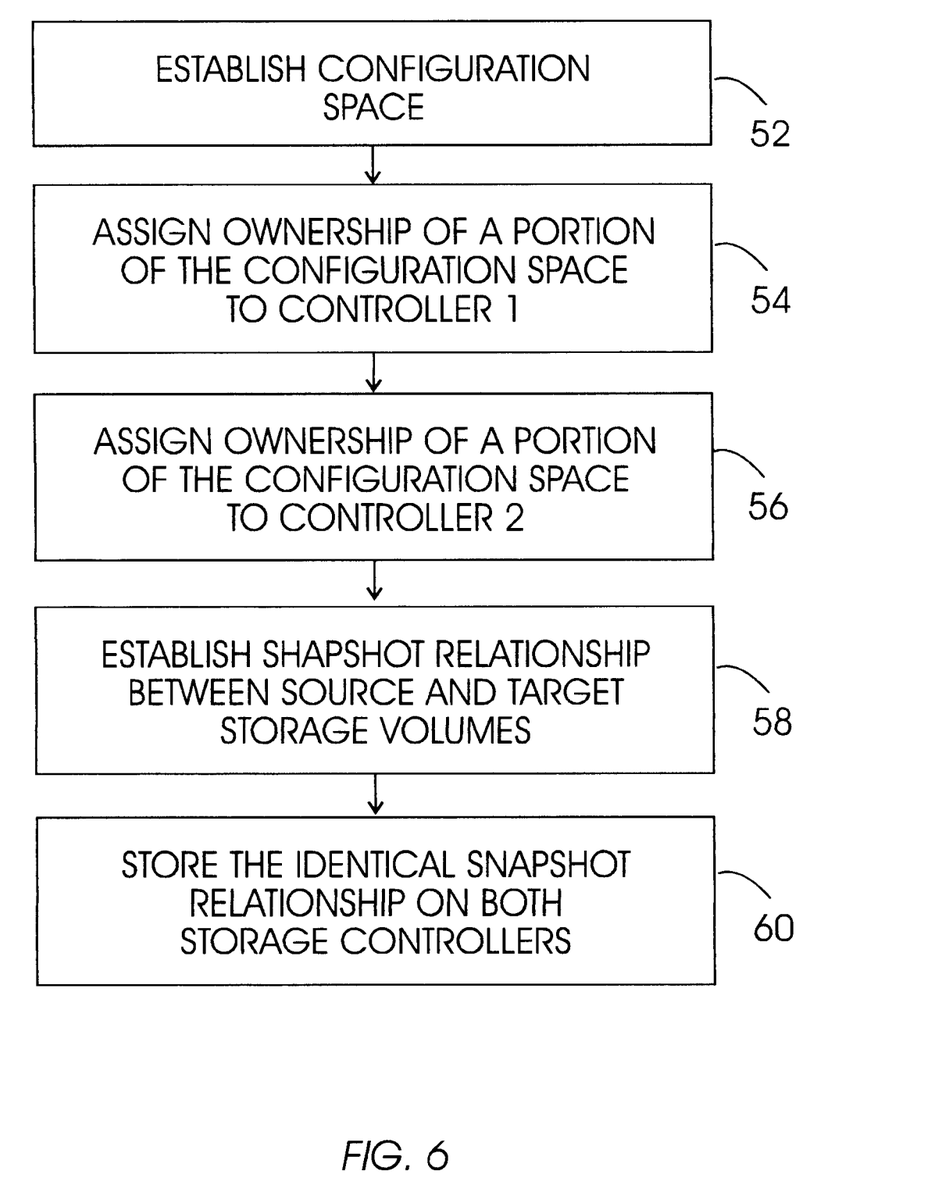
FIG. 6 shows a flow chart of the process for snapshot configuration set-up for dual controllers in accordance with a preferred embodiment of the data management system shown in FIG. 1.
Figure 7:
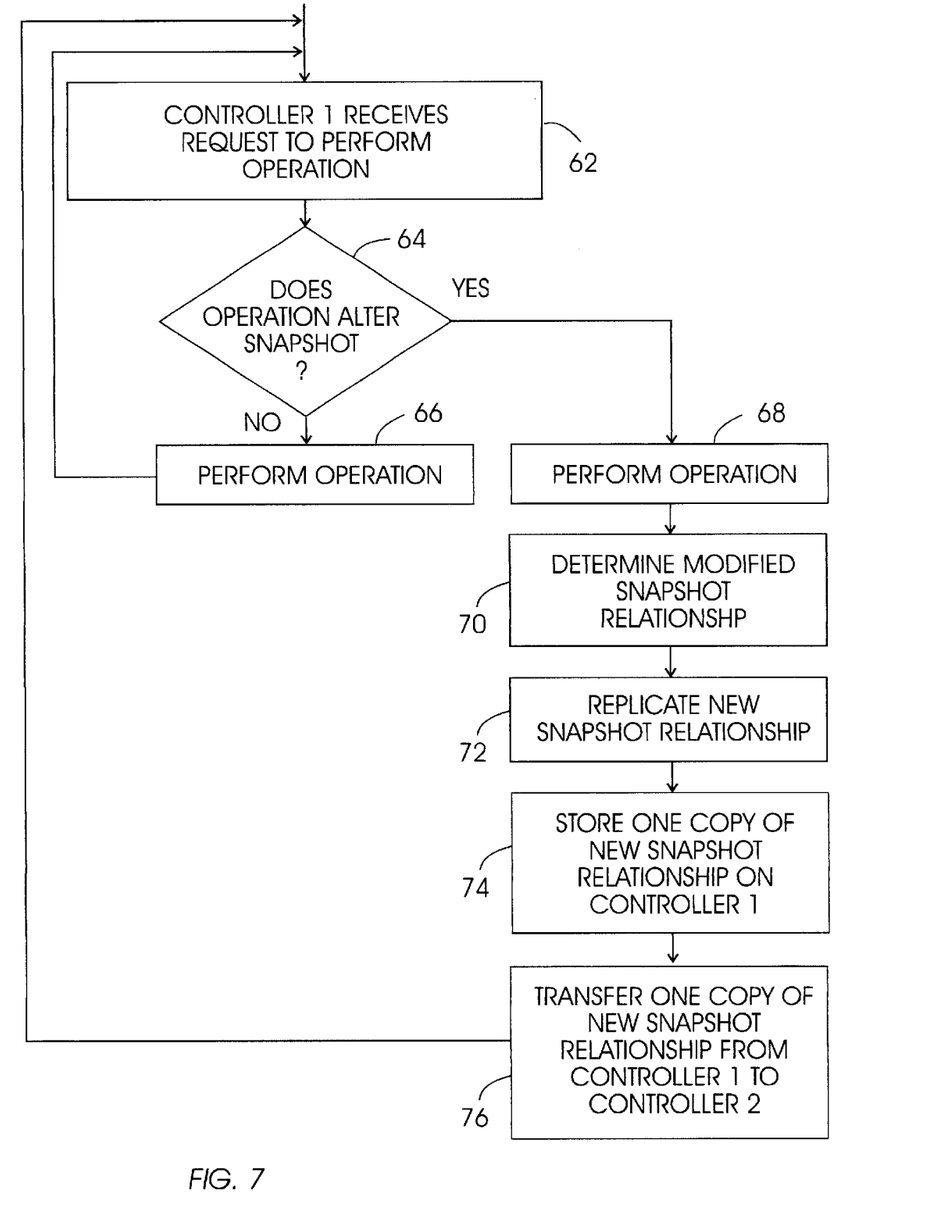
FIG. 7 shows a flow chart of the process for performing snapshot altering operations in accordance with a preferred embodiment of the data management system shown in FIG. 1.
Figure 8:
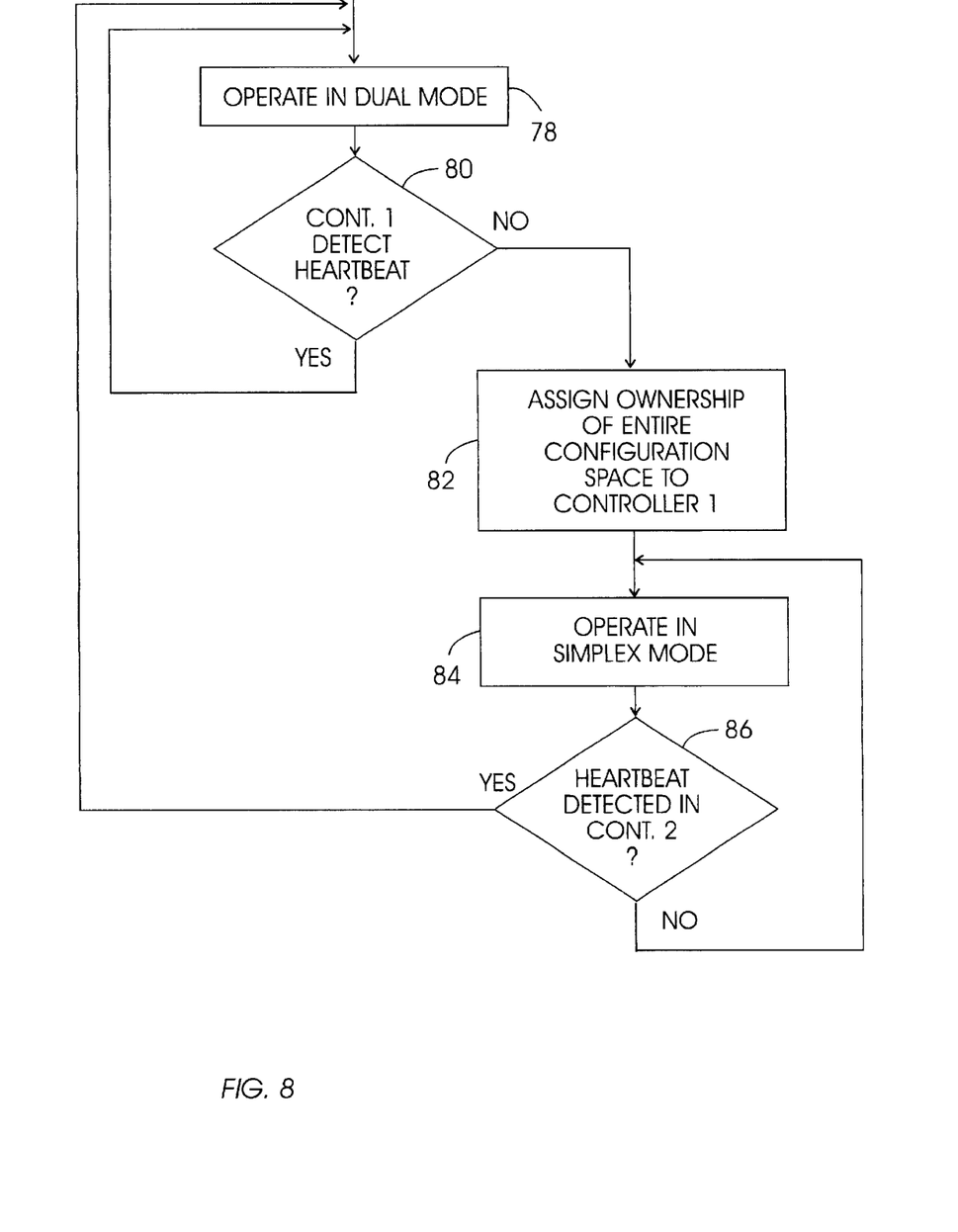
FIG. 8 shows a flow chart of the recovery process in the event of the failure of one storage controller in accordance with a preferred embodiment of the data management system shown in FIG. 1.

Indeed, the flow charts in FIGS. 6–8 herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Figure 3:
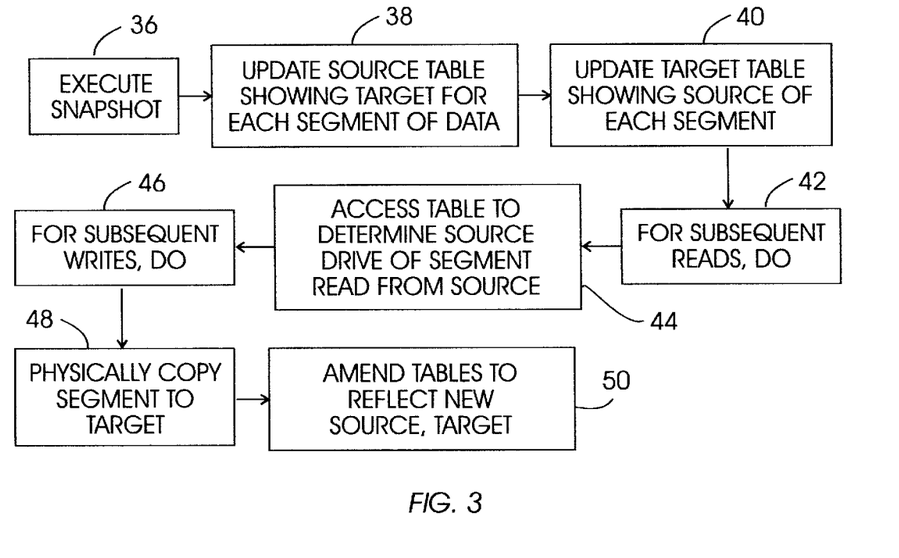
FIG. 3 is a flow chart of an exemplary snapshot logic.
Figure 4:
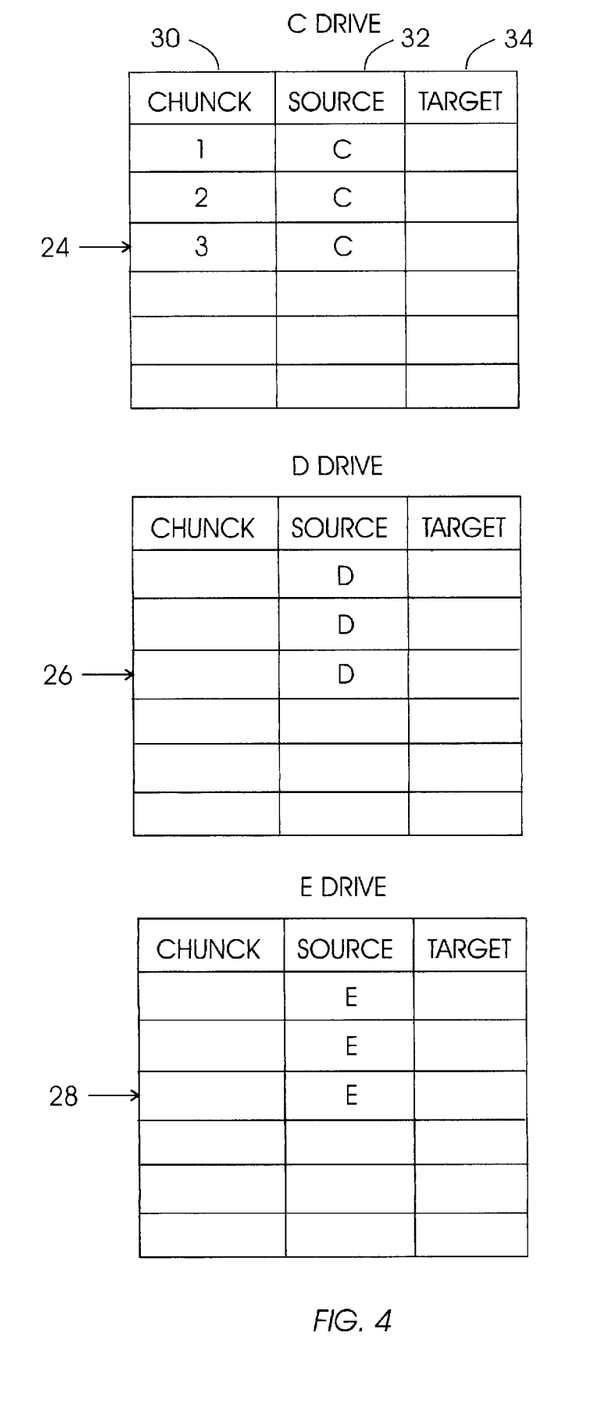
FIG. 4 is a schematic representation of snapshot tables before a first snapshot.

Now referring to FIGS. 3–5B, a representative snapshot process in simplex-mode can be seen. FIG. 4 shows snapshot tables 24, 26, 28 labeled "C drive", "D drive", and "E drive" prior to the invocation of any snapshot relationships, it being understood that the snapshot tables 24, 26, 28 are respectively provided for the storage volumes C, D, and E shown in FIG. 1. As shown, taking the C drive table 24 as an example, each table 24, 26, 28 has a respective segment column 30 for listing one or more data segments, e.g., of block size. In the present example, only segments 1–3 are listed in FIG. 4 for the C drive table 24 for clarity of disclosure. Also, each table 24, 26, 28 has a respective source volume column 32. As shown, the source column 32 for the C drive table 24 prior to the invocation of any snapshots lists the source volume for all segments as being the C volume shown in FIG. 1. Moreover, each table 24, 26, 28 has a respective target volume column 34. As shown, the target column 34 for the C drive table 24 prior to the invocation of any snapshots lists no target volumes for the segments, because no snapshots have been invoked. Likewise, the D drive table 26 and E drive table 28 each list their own associated storage volumes as the sources for data segments listed in the tables 26, 28.

Figure 5A:
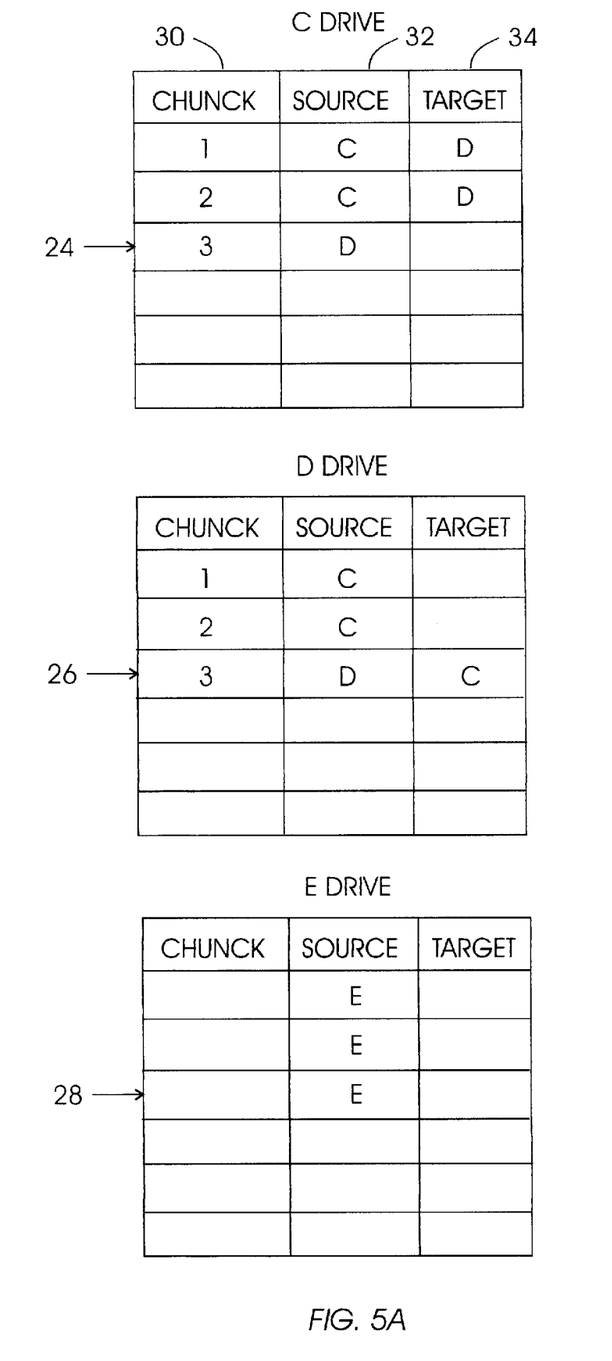
FIG. 5A is a schematic representation of snapshot tables after a snapshot relationship from the C volume to the D volume has been established.

Having thus explained the preferred simplex-mode snapshot table format, reference is now made to FIGS. 3 and 5A. At block 36 in FIG. 3, a snapshot relationship is invoked for execution. In the present illustration, assume that a user has input a command to cause a snapshot of segments 1–3 on the C volume onto the D volume. Under these circumstances, the C volume is the source volume (and the C drive table 34 the source table), whereas the D volume is the target volume (and the D drive table 36 the target table).

FIG. 5A shows the resulting snapshot tables 24, 26. As indicated at block 38 of FIG. 3 and as shown in FIG. 5A, the target column 34 of the C drive table 24 (the source table) has been altered to list the D volume as the target volume for the segments 1–3. Also, the source column 32 of the D drive table 26 (the target table) lists the C volume as being the source volume for the segments 1–3, as indicated at block 40 of FIG. 3.

With the above in mind, both reads and writes can be executed against either of the source or target volumes involved in a snapshot relationship. More particularly, for each read to a volume the logic enters a DO loop at block 42 in FIG. 3, and then proceeds to block 44 to access the table of the requested volume to determine the source volume for the segment or segments for which a read has been requested. Because, for each segment 1–3, the source volume that is indicated is the same across all tables 24, 26 that are in a snapshot relationship, the source volume will always be read, regardless of the volume to which the request has been made.

Accordingly, when a request is made to the C volume to read, e.g., segment #2, the C drive table 24 is accessed and the source column examined to determine that the source of the requested segment is in fact the C volume. The read request is then satisfied from the C volume. In contrast, when a request is made to the D volume to read, e.g., segment #2, the D drive table 26 is accessed and the source column examined to determine that the source of the requested segment is in fact the C volume. The read request is then redirected such that segment #2 is read from the C volume.

When a write request is received, a DO loop is entered at block 46 of FIG. 3, wherein the logic moves to block 48 to physically copy the requested segment to the target volume as indicated in the target column 34 of the source table, prior to writing a new version of the segment. Then, at block 50, the respective tables are amended as appropriate. To illustrate, assume that a write request to segment #3 has been received, and that in response segment #3 is physically copied from the C volume to the D volume prior to modification in the C volume. Then, the write can be executed against segment #3 in the C volume. In the meantime, the source columns 34 of the source table (i.e., the C drive table 24) and target table (i.e., the D drive table 36) are changed to indicate that the snapshot source for segment #3 is the D volume.

Figure 5B:
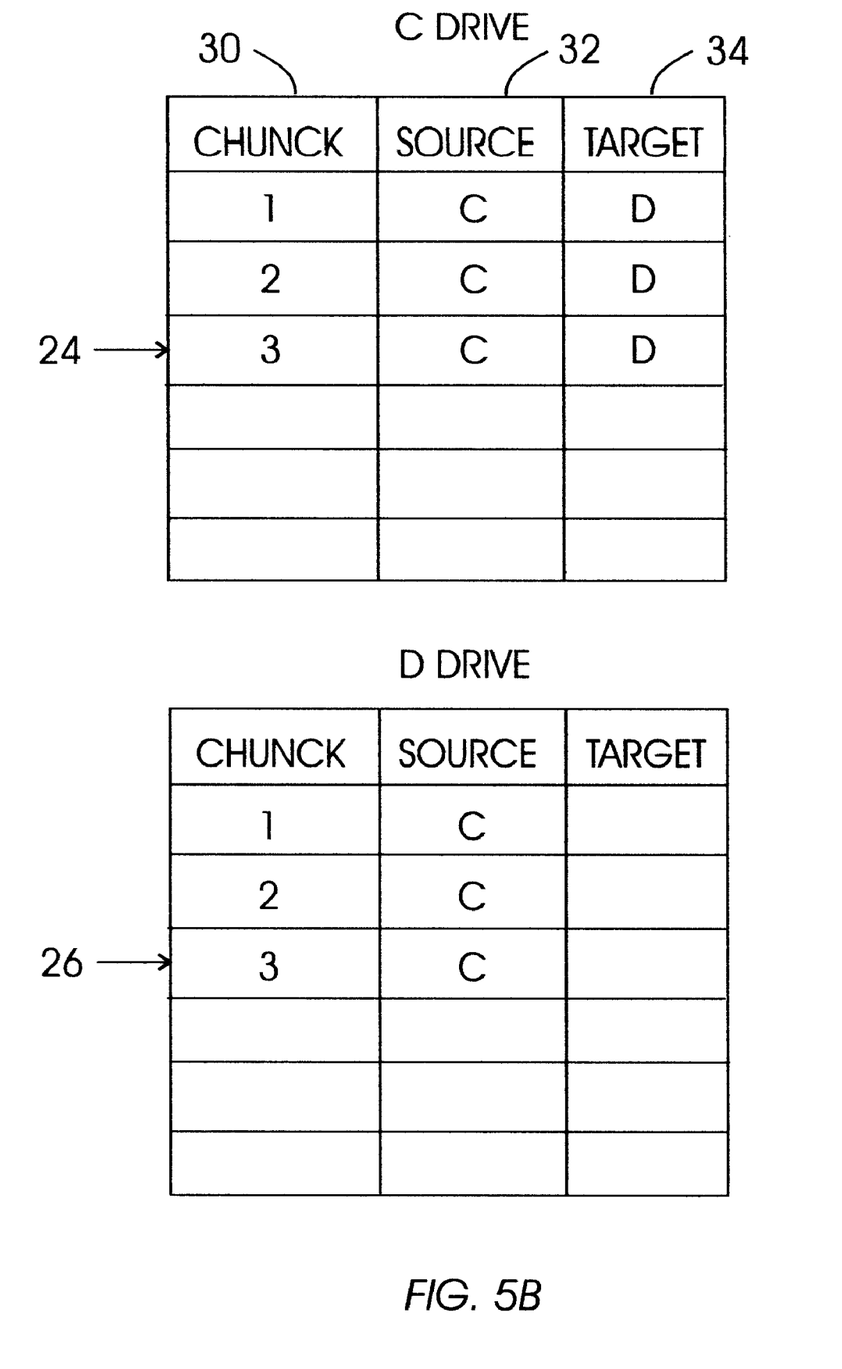
FIG. 5B is a schematic representation of snapshot tables after a snapshot relationship from the D volume to the C volume has been established subsequent to the snapshot shown in FIG. 5A.

Further assume that after the snapshot of C to D, it is desired to snapshot D back onto C at a later time, after the above-described write operation. FIG. 5B shows the states of the snapshot tables 24, 26 after such an event. As shown, the source volume for segment nos. 1 and 2 is indicated to be the C volume in both the C drive table 24 and D drive table 26, whereas the source for segment #3 is indicated as being the D volume in both tables 24, 26. In contrast, in the C drive table 24 the target volume for segments 1 and 2 is indicated as being the D volume, and no target volume for segment #3 is indicated in the target column 34 of the C drive table 24. In the D drive table 26, on the other hand, no target volume is indicated for segments 1 and 2, whereas the C volume is indicated as being the target volume for segment #3. In other words, in the target column 34 of a snapshot table, when the corresponding volume is the target volume of a segment, a null entry is made for that segment. Additional details of the above snapshot process are described in co-pending United States patent application entitled "System and Method for Restartable Concurrent Snapshot Management", which is owned by the assignee of the present application and which is incorporated by reference in its entirety.

FIGS. 6–8 illustrate the techniques of the present invention, which provide for the use of snapshot management in a dual-controller environment. In general the present invention achieves the management of fault-tolerant snapshots in a dual-controller system by tightly coupling the two controllers, such as controllers 18 and 20 shown in FIG. 1. This coupling is accomplished by having the two controllers share the same configuration space that maps logical drives onto physical disks. This sharing technique gives each controller ownership (control) of a portion of the configuration. Ownership can change frequently from one controller to another (based on accesses), but ownership is not shared. Updates to one controller's configuration are immediately reflected on the other controller. Because of the tightly coupled configuration space between the two controllers, the snapshot operation can perform configuration changes in one controller and those changes will always be reflected in the other controller.

Consequently, failure on one controller will not result in the loss of vital metadata changes because they will be saved in the other controller. The system then can operate in simplex-mode as long as the other controller is disabled. Once the failed controller has been restored, the system can resume dual-mode operation.

A private communication channel, such as channel 19 shown in FIG. 1, allows the controllers to keep abreast of each other. It does this by means of a "heartbeat" message that is sent by each controller to the other on a regular basis. The absence of the heartbeat will indicate to a controller that the other controller has failed and the operating controller will immediately convert to simplex-mode and take over all the functions of both controllers. Once the heartbeat resumes, the controllers will then revert to dual-mode operation.

One important feature of the invention is controller interoperability. This means that the snapshot operation is independent of which controller owns the configuration space for either the source or target logical drive involved in any snapshot. This assures that the snapshot operation can proceed without significant modification when the system converts to simplex mode upon the failure of one controller.

FIG. 6 shows a flowchart of some of the initial steps involved in setting up the data storage system 10 with dual-mode controllers in accordance with one embodiment of the invention. The configuration space that maps the logical drives onto physical disks is first defined, as shown in at block 52. Next, controller 1 (shown in FIG. 1 at reference numeral 18) is assigned ownership of a portion of the configuration space, as shown in block 54. Similarly, in block 56, controller 2 (shown in FIG. 1 at reference numeral 20) is assigned ownership of a different portion of the configuration space. While ownership can change frequently from one controller to another (based on accesses), the ownership of any portion of configuration space is not shared by the two controllers. A snapshot relationship is then established between the source and target storage volumes, as shown in block 58. Then, as indicated in block 60, the identical snapshot relationship is stored on both controllers. This information will reside in the snapshot modules 21 and 22, as illustrated in FIG. 1.

The snapshot metadata stored in the controllers is allowed to diverge as long as it does not affect correctness. Since both the configuration metadata can be considered to be identical on both machines, issues like configuration ownership changes do not affect snapshot operation. In addition, it also implies the independence of the snapshot operation from which controller owns the configuration for the source and the target logical drives.

A consistency mechanism layer in the dual mode fault-tolerant snapshot mechanism of the data storage system 10 ensures that the two replicas of the snapshot metadata are synchronized. For example, the source segment can be repeatedly copied over to a target segment without changing the correctness of the metadata. Such repeatable snapshot operations are referred to as "idempotent". In idempotent operations even if the metadata alterations are lost they do not result in the loss of data. For example, assume that "x" is copied from A to B, and the operation is recorded. If this record is lost, there is no harm in copying "x" from A to B again, as long as there are no changes to A. However, if there has been a write operation, a segment will be changed and the operation may not be repeated. Such non-repeatable operations are non-idempotent. File open and file close operations are also not repeatable and are considered non-idempotent.

The present invention leverages the idempotent behavior of certain operations to minimize the number of synchronization transactions. If a metadata alteration is idempotent, then a controller does not need to synchronize the metadata alterations with its partner controller. On the other hand if the operation is non-idempotent, synchronization must take place.

There are at least four examples of idempotent operations that require synchronization. These include: 1) a write to a target or a source segment occurs that causes a change to the snapshot metadata; 2) on an establish operation that sets up the snapshot relationships between the source and target drives, such as described in FIG. 6; 3) on a command to withdraw the snapshot relationships ongoing in a command; and 4) on a restart in one controller (e.g. after a failure recovery) to synchronize with the snapshot metadata on the other storage controller. Thus, when any of these events occur, the process will recognize that the snapshot metadata is changed and synchronize the controllers.

Referring to FIG. 7, there is shown a flow chart of the operation of the data storage system 10 in accordance with one embodiment of the invention. FIG. 7 shows how the controllers are synchronized in accordance with this embodiment. Once the storage controllers 18 and 20 have been set up as described in FIG. 6, they will receive requests to perform various operations. In block 62, controller 1 receives such a request. The system then determines if this operation is idempotent such that it will significantly alter the current snapshot metadata.

In decision block 64, the system determines whether the operation is idempotent. If it is. the system performs the operation, as shown in block 66. After the operation is performed, the process returns to step 62 where any subsequent steps are received. If instead, it was determined in decision block 64 that the operation is non-idempotent, the process will synchronize the two controllers as follows. First, the operation is performed, block 68, and the modified snapshot relationship is determined, as shown in block 70.

Once this modified snapshot relationship is determined in block 70, two copies are generated, as shown in block 72. One copy is sent to controller 1, block 72, and one copy is sent to controller 2, as shown in block 76. The process in FIG. 7 will be essentially the same if controller 2 receives the command instead of controller 1. As a result of the process in FIG. 7 it can be safely assumed that configuration changes in one controller will be reflected in the other controller. The transfer of the new snapshot relationship may take place through communication channel 19 or directly from the host computer 12. In a preferred embodiment, the storage controllers 18 and 20, under control of the host computer 12, perform the process steps in FIGS. 6–8.

An important feature of the invention is its resilience to the failure of a single storage controller. FIG. 8 shows a flow chart of the process steps used to convert from dual-mode to simplex-mode when one controller fails. With the data storage system 10 operating in dual-mode, as indicated in block 78, controller 1 will periodically determine if a heartbeat message, or signal, is received from controller 2, as shown in decision block 80. If the heartbeat is received, the process continues returns to block 78 and continues to operate in dual-mode. If instead, no heartbeat is determined, then the process moves to block 82 where ownership of the entire configuration space is assigned to controller 1. The system then operates in simplex-mode using only controller 1. as indicated in block 84. The process will periodically check to determine is a heartbeat from controller 2 has resumed in decision block 86. (Alternatively, the system will simply wait for a restart command to begin operating in dual-mode again.) If no heartbeat is detected the system continues in simplex-mode. If a heartbeat is detected again the process will revert to dual-mode operation. However, as noted above upon a restart, the process in FIG. 7 will detect that an operation is requested that will alter the snapshot relationships. In this case, changes to the snapshot metadata that occurred during the simplex-mode operation will be determined and transferred to controller 2 so that both controllers are again synchronized.

The process described in FIG. 8 for controller 1 will also be performed by controller 2 to handle the occurrence of a failure of controller 1. By keeping the identical snapshot metadata present in both controllers the number of messages required is minimized. Other possible techniques for insuring that snapshot data is not lost in the event of controller failure would likely result in a much larger number of messages.

While the particular SYSTEM AND METHOD FOR MINIMIZING MESSAGE TRANSACTIONS FOR FAULT-TOLERANT SNAPSHOTS IN A DUAL-CONTROLLER ENVIRONMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or "steps for".

What is claimed is:

1. A computer-implemented method for managing data snapshots among source and target storage volumes in a dual-controller environment, comprising:

establishing a configuration space that maps the source and target storage volumes to first and second logical drives respectively;

dividing the configuration space into first and second portions, wherein the first portion is controlled by a first storage controller and the second portion is controlled by a second storage controller;

establishing a snapshot relationship between the source and target storage volumes such that portions of data on the source storage volume are logically mirrored on the target storage volume; and storing the identical snapshot relationship in both the first and second storage controllers.

2. The method according to claim 1 further comprising, in response to a request to perform an operation that results in a modification of the snapshot relationship, performing the operation and transferring a modified snapshot relationship to the first and second controllers that reflects the operation, whereby the snapshot relationship data in the first and second controllers are synchronized.

3. The method according to claim 1 further comprising:

sending periodic signals between the first and second storage controllers;

determining that one of the storage controllers has failed based on an absence of signals from the other storage controller; and placing the entire configuration space under the control of said one storage controller.

4. The method according to claim 2 wherein the operation is a write operation and further comprising:

establishing logical copies of data in each said portion in the source storage volume to a corresponding portion in the target storage volume; and writing to the portion in the source storage volume after the logical copy of the portion in the source storage volume has been established in the target volume.

5. The method according to claim 2 wherein the operation of copying a portion of the source storage volume over to the target storage portion does not alter the snapshot relationship, and hence said synchronization is not performed in response thereto.

6. The method according to claim 2 further including modifying the division of the configuration space between the first and second controllers, and wherein said modifying of the division of the configuration space between the first and second controllers does not alter the snapshot relationship and hence said synchronization is not performed in response thereto, whereby the snapshot operation is independent of which controller is assigned to a particular portion of the source and target logical drives.

7. The method according to claim 2 wherein said operation is one that sets up the snapshot relationships between source and target drives.

8. The method according to claim 2 wherein said operation withdraws the snapshot relationships.

9. The method according to claim 2 wherein said operation is a restart operation.

10. A computer system comprising:

source and target storage volumes;

first and second logical drives, wherein the source and target storage volumes are mapped to the first and second logical drives according to a defined configuration space;

first and second storage controllers, the first storage controller controlling a first portion of the configuration space and the second storage controller controlling a second portion of the configuration space;

means for establishing a snapshot relationship between the source and target storage volumes such that portions of data on the source storage volume are logically mirrored on the target storage volume: and means for storing the identical snapshot relationship in both the first and second storage controllers.

11. The computer system according to claim 10 further comprising:

in response to a request to perform an operation that results in a modification of the snapshot relationship, means for performing the operation and transferring a modified snapshot relationship to the first and second controllers that reflects the operation, whereby the snapshot relationship data in the first and second controllers are synchronized.

12. The computer system according to claim 11 wherein the operation is a write operation and further comprising:

means for establishing logical copies of data in each said portion in the source storage volume to a corresponding portion in the target storage volume; and writing to the portion in the source storage volume after the logical copy of the portion in the source storage volume has been established in the target volume.

13. The computer system according to claim 12 wherein the operation of copying a portion of the source storage volume over to the target storage portion does not alter the snapshot relationship, and hence said synchronization is not performed in response thereto.

14. The computer system according to claim 11 further including means for modifying the division of the configuration space between the first and second controllers such that said modifying the division of the configuration space between the first and second controllers does not alter the snapshot relationship and hence said synchronization is not performed in response thereto, whereby the snapshot operation is independent of which controller is assigned to a particular portion of the source and target logical drives.

15. The computer system according to claim 11 wherein said operation is one that sets up the snapshot relationships between source and target drives.

16. The computer system according to claim 11 wherein said operation withdraws the snapshot relationships.

17. The computer system according to claim 11 wherein said operation is a restart operation.

18. The computer system according to claim 11 further comprising:

means for sending periodic signals between the first and second storage controllers:

means for determining that one of the storage controllers has failed based on an absence of signals from the other storage controller; and means for placing the entire configuration space under the control of said one storage controller.

19. A computer program product, comprising:

a computer program storage device;

computer-readable instructions on the storage device for causing a computer to undertake method acts to facilitate dual-controller management of data snapshot operations between source and target storage volumes, the method acts comprising:

establishing a configuration space that maps the source and target storage volumes to first and second logical drives respectively;

dividing the configuration space into first and second portions, wherein the first portion is controlled by a first storage controller and the second portion is controlled by a second storage controller;

establishing a snapshot relationship between the source and target storage volumes such that portions of data on the source storage volume are logically mirrored on the target storage volume; and storing the identical snapshot relationship in both the first and second storage controllers.

20. The computer program product according to claim 19 further comprising:

in response to a request to perform an operation that results in a modification of the snapshot relationship, performing the operation and transferring a modified snapshot relationship to the first and second controllers that reflects the operation, whereby the snapshot relationship data in the first and second controllers are synchronized.

* * * * *